US009129307B2

(12) United States Patent
Fowler et al.

(10) Patent No.: US 9,129,307 B2
(45) Date of Patent: Sep. 8, 2015

(54) FEE-BASED DISTRIBUTION OF MEDIA BASED ON DEVICE PROXIMITY

(75) Inventors: David Keith Fowler, Hastings, MN (US); Zachary Adam Garbow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1660 days.

(21) Appl. No.: 11/752,390

(22) Filed: May 23, 2007

(65) Prior Publication Data

US 2008/0294548 A1 Nov. 27, 2008

(51) Int. Cl.
*G06Q 30/00* (2012.01)
*G06Q 30/02* (2012.01)
*G06Q 20/10* (2012.01)
*G06Q 30/04* (2012.01)

(52) U.S. Cl.
CPC ............ *G06Q 30/0261* (2013.01); *G06Q 20/10* (2013.01); *G06Q 30/02* (2013.01); *G06Q 30/0251* (2013.01); *G06Q 30/0267* (2013.01); *G06Q 30/04* (2013.01)

(58) Field of Classification Search
CPC ... G06Q 30/02; G06Q 30/06; G06Q 30/0631; G06Q 30/0633; G06Q 30/00; G06Q 30/0261; G06Q 30/0251; G06Q 30/0267; G06Q 20/10; G06Q 30/04
USPC .................................... 705/26, 27, 26.1, 27.1
See application file for complete search history.

(56) References Cited

U.S. PATENT DOCUMENTS

| 6,018,774 | A | 1/2000 | Mayle et al. | |
|---|---|---|---|---|
| 6,396,537 | B1 * | 5/2002 | Squilla et al. | 348/239 |
| 6,542,936 | B1 | 4/2003 | Mayle et al. | |
| 6,591,068 | B1 * | 7/2003 | Dietz | 396/429 |

(Continued)

FOREIGN PATENT DOCUMENTS

| EP | 1545129 A1 | 6/2005 |
|---|---|---|
| EP | 1619838 A1 | 1/2006 |

(Continued)

OTHER PUBLICATIONS

"Bluetooth Communication Topology," located at www.bluetooth.com/Bluetooth/Learn/Works/Communications_Topology.htm, dated Mar. 8, 2007 [retrieved from Internet Archive on Oct. 7, 2010].*

(Continued)

*Primary Examiner* — Anne Georgalas
(74) *Attorney, Agent, or Firm* — Patterson & Sheridan, LLP

(57) ABSTRACT

Embodiments of the invention provide techniques for commercial transactions for the sale of images carried out over short-range wireless transmissions. In one embodiment, the transaction may be initiated by a vendor (e.g., a professional photographer), who transmits a wireless signal including an offer for sale of an image. A customer wishing to purchase the image responds by sending a wireless signal including an acceptance of the offer. In another embodiment, the transaction may be initiated by a customer, who transmits a wireless signal including a request for an image to be fulfilled by a vendor. A vendor agreeing to supply the image responds by sending a wireless signal including an acceptance of the request. By offering the images to customers who are in close proximity to the image capture, the vendor may increase the likelihood that the images will be purchased.

18 Claims, 5 Drawing Sheets

(56) References Cited

U.S. PATENT DOCUMENTS

| | | | |
|---|---|---|---|
| 6,871,231 B2 | 3/2005 | Morris | |
| 6,907,225 B1 | 6/2005 | Wilkinson | |
| 6,999,112 B2 | 2/2006 | Seaman et al. | |
| 7,035,440 B2* | 4/2006 | Kaku | 382/115 |
| 7,336,928 B2 | 2/2008 | Paalasmaa et al. | |
| 7,619,999 B2* | 11/2009 | DaCosta | 370/312 |
| 7,639,279 B2* | 12/2009 | Shinohara et al. | 348/211.3 |
| 7,643,658 B2* | 1/2010 | Kilner et al. | 382/118 |
| 7,966,223 B2* | 6/2011 | David | 705/26.1 |
| 8,914,897 B2* | 12/2014 | Fowler et al. | 726/27 |
| 2001/0034648 A1* | 10/2001 | Caldwell | 705/14 |
| 2002/0164987 A1 | 11/2002 | Caronni et al. | |
| 2003/0103149 A1* | 6/2003 | Kinjo et al. | 348/231.5 |
| 2003/0182143 A1* | 9/2003 | Conrad et al. | 705/1 |
| 2004/0230663 A1 | 11/2004 | Ackerman | |
| 2005/0052685 A1 | 3/2005 | Herf et al. | |
| 2005/0104976 A1* | 5/2005 | Currans | 348/231.5 |
| 2006/0009155 A1* | 1/2006 | Paalasmaa et al. | 455/41.2 |
| 2006/0044599 A1* | 3/2006 | Lipowitz et al. | 358/1.15 |
| 2006/0046700 A1 | 3/2006 | Anderson | |
| 2006/0182045 A1 | 8/2006 | Anderson | |
| 2007/0067297 A1* | 3/2007 | Kublickis | 707/9 |
| 2007/0105497 A1 | 5/2007 | Ritala | |
| 2007/0162971 A1* | 7/2007 | Blom et al. | 726/17 |
| 2007/0236505 A1 | 10/2007 | Jung et al. | |
| 2008/0176514 A1 | 7/2008 | Nadas | |
| 2008/0294774 A1 | 11/2008 | Fowler et al. | |
| 2009/0186575 A1 | 7/2009 | Cedo Perpinya et al. | |

FOREIGN PATENT DOCUMENTS

| | | |
|---|---|---|
| JP | 2005293513 A | 10/2005 |
| WO | 03033209 A2 | 4/2003 |
| WO | 2005060254 A1 | 6/2005 |
| WO | 2006056881 A1 | 6/2006 |

OTHER PUBLICATIONS

"In future, everything will be a computer; Does 'pervasive computing' present privacy risk?", by Mark Medley, National Post, Ontario, Canada, May 19, 2007.*

Pering, Trevor et al, "Face-to-Face Media Sharing Using Wireless Mobile Devices", Proceedings of the Seventh IEEE International Symposium on Multimedia (ISM'05), Mar. 2005.

Ronnholm, Valter—"Push-to-Talk Over Bluetooth", Proceedings of the 39th Hawaiii International Conference on System Sciences, May 2006, pp. 1-10.

Office Action History of U.S. Appl. No. 11/752,378, dated Apr. 15, 2010.

Final Office Action of U.S. Appl. No. 11/752,378 dated Sep. 27, 2010.

* cited by examiner

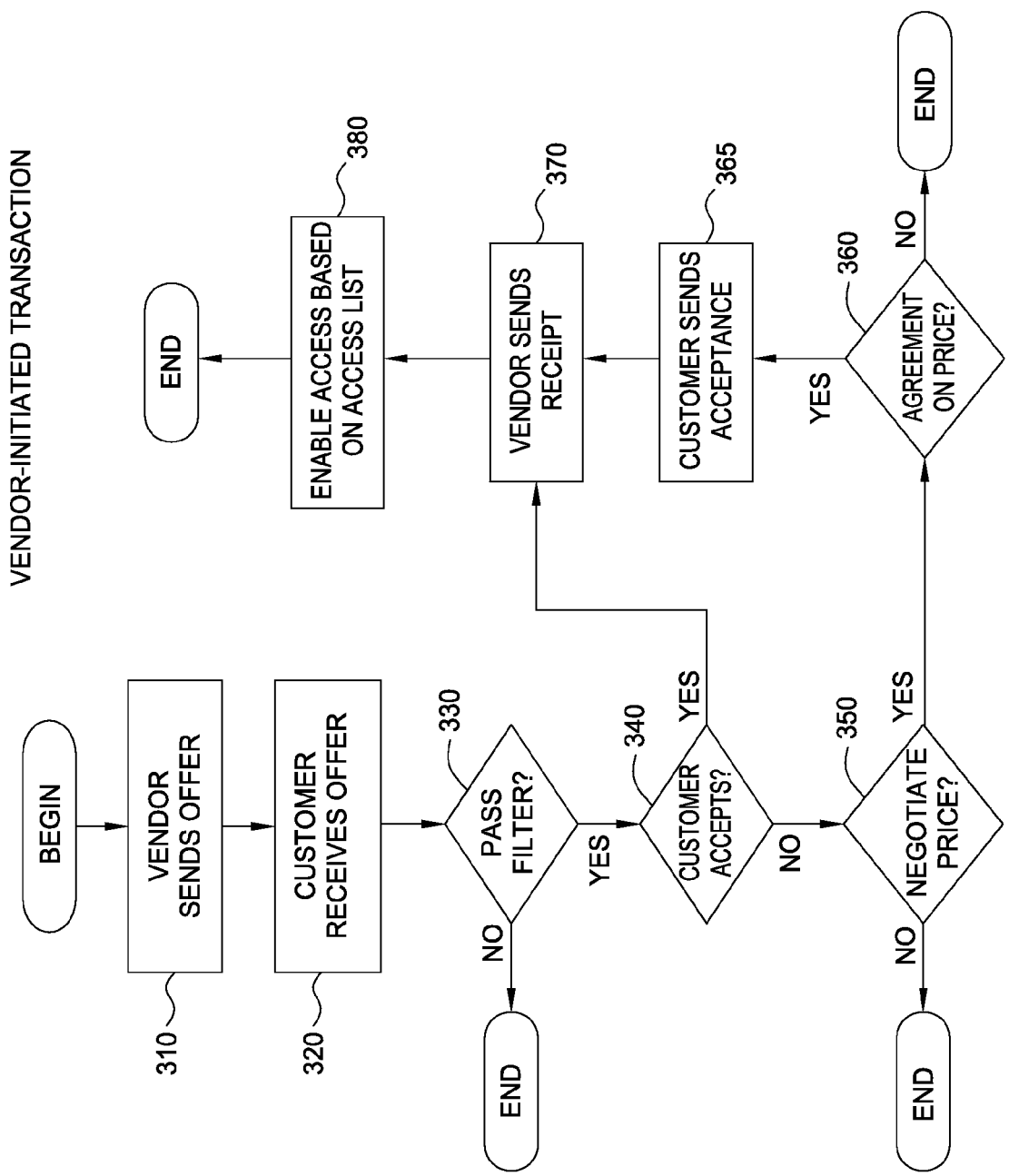

FEE-BASED DISTRIBUTION OF MEDIA BASED ON DEVICE PROXIMITY

CROSS-REFERENCE TO RELATED APPLICATIONS

This application is related to U.S. patent application Ser. No. 11/752,378, entitled CONTROLLING ACCESS TO DIGITAL IMAGES BASED ON DEVICE PROXIMITY, filed May 23, 2007, by Fowler et al. This related patent application is herein incorporated by reference in its entirety.

BACKGROUND OF THE INVENTION

1. Field of the Invention

The invention relates to data processing. More specifically, the invention relates to techniques for fee-based distribution of media based on device proximity.

2. Description of the Related Art

The technologies of digital cameras and the Internet have been widely adopted by consumers. As a result, there is a growing demand for the sharing of photographs and video (hereafter referred to as "images").

In some cases, such images may be captured by a commercial vendor (e.g., a professional photographer). Conventionally, a customer wishing to purchase commercial images that have been captured at a given location must carry out a manual transaction on the spot. Such transactions are typically difficult to carry out, since they include the manual steps of locating the vendor, selecting an image for purchase, negotiating a price, and arranging the transfer of the image itself.

Therefore, there is a need in the art for techniques for fee-based distribution of media based on device proximity.

SUMMARY OF THE INVENTION

The present invention generally relates to data processing. More specifically, the invention relates to controlling access to digital images based on device proximity.

One embodiment provides a computer-implemented method of selling an image, comprising: in response to capturing the image on an image capture device, sending a wireless offer signal from the image capture device, wherein the wireless offer signal comprises an offer for sale of the image for a fee; receiving, by the image capture device, at least one wireless acceptance signal from at least one accepting device indicating that the respective accepting device accepts the offer included in the wireless offer signal, wherein the respective wireless acceptance signals include respective identifiers corresponding to the respective accepting devices; and generating, by the image capture device, an access list corresponding to the image, wherein the access list is composed according to the respective identifiers contained in the respective wireless acceptance signals received by the image capture device, thereby limiting users permitted to access the image to those associated with the respective accepting devices.

Another embodiment provides a computer-implemented method of selling an image, comprising: receiving, by an image capture device, a wireless request signal from a requesting device comprising a request for purchase of one or more images for a fee, wherein the wireless request signal comprises (i) at least one condition describing the one or more images; and (ii) an identifier corresponding to the requesting device; capturing, by the image capture device, at least one image fulfilling the at least one condition; generating, by the image capture device, an access list corresponding to the image, wherein the access list is composed to comprise the identifier corresponding to the requesting device, thereby limiting users permitted to access the image to those associated with the respective accepting device; and providing access, based on the access list, to a user who has either paid the fee or agreed to pay the fee.

Yet another embodiment provides a computer readable medium containing a program, which, when executed, performs an operation, comprising: in response to capturing the image on an image capture device, sending a wireless offer signal from the image capture device, wherein the wireless offer signal comprises an offer for sale of the image for a fee; receiving, by the image capture device, at least one wireless acceptance signal from at least one accepting device indicating that the respective accepting device accepts the offer included in the wireless offer signal, wherein the respective wireless acceptance signals include respective identifiers corresponding to the respective accepting devices; and generating, by the image capture device, an access list corresponding to the image, wherein the access list is composed according to the respective identifiers contained in the respective wireless acceptance signals received by the image capture device, thereby limiting users permitted to access the image to those associated with the respective accepting devices.

Yet another embodiment provides a system, comprising an image capture device comprising circuitry configured to: in response to capturing an image, send a wireless offer signal comprising an offer for sale of the image for a fee; receive at least one wireless acceptance signal from at least one accepting device indicating that the respective accepting device received the wireless offer signal, wherein the respective acceptance signals includes respective identifiers corresponding to the respective accepting device; generate an access list corresponding to the image, wherein the access list is composed according to the respective identifiers contained in the respective acceptance signals received by the image capture device, thereby limiting users permitted to access the image to those associated with the respective accepting devices; and provide the access list to a computing device configured to control access to the image based on the access list.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a flow diagram illustrating a method for a vendor-initiated transaction for the fee-based distribution of media based on device proximity, according to an exemplary embodiment.

DETAILED DESCRIPTION OF THE PREFERRED EMBODIMENTS

Figure 1:
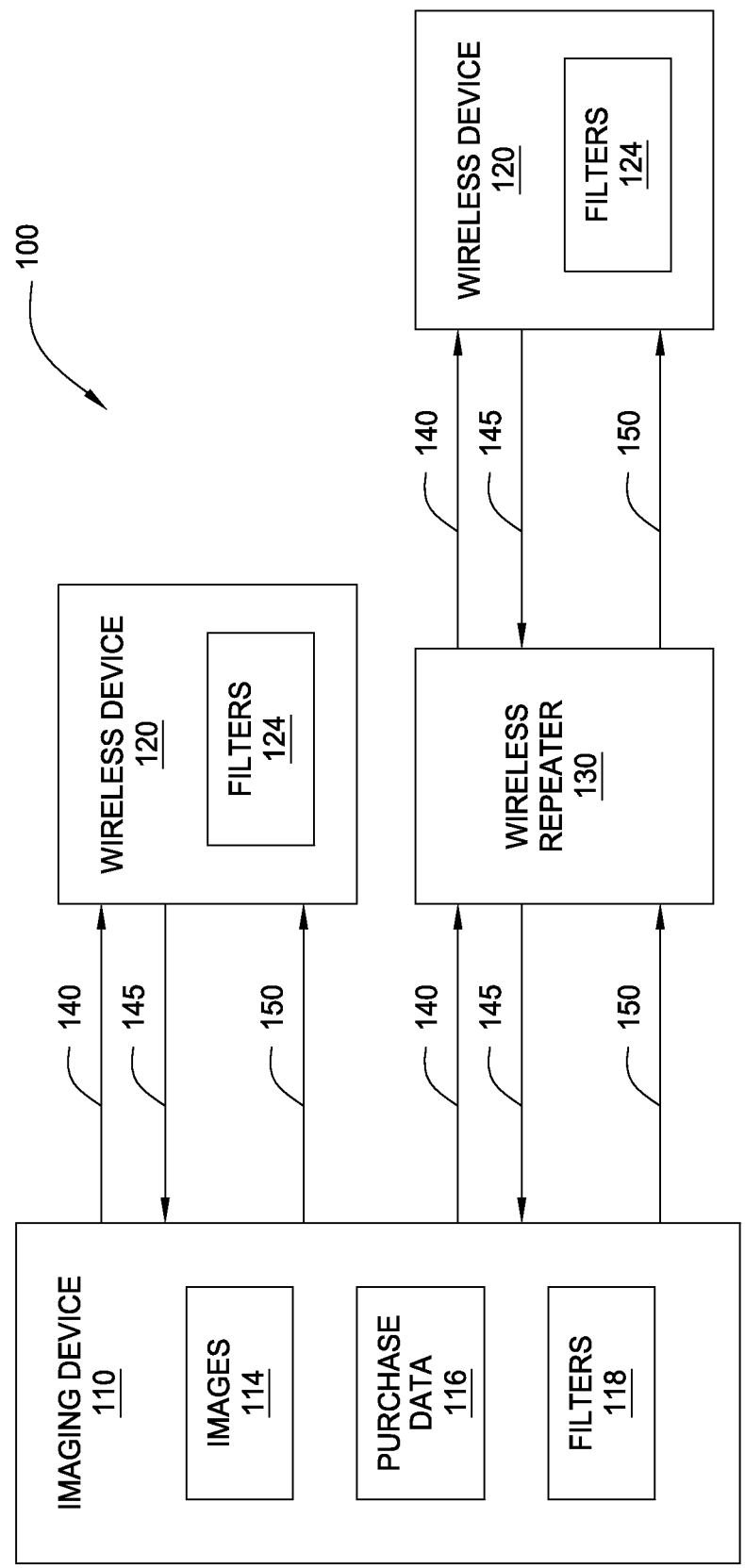
FIG. 1 is a block diagram illustrating a computing and data communications environment, according to an exemplary embodiment.

Embodiments of the invention provide techniques for commercial transactions for the sale of images carried out over short-range wireless transmissions. In one embodiment, the transaction may be initiated by a vendor (e.g., a professional photographer), who transmits a wireless signal including an offer for sale of an image. A customer wishing to purchase the image responds by sending a wireless signal including an acceptance of the offer. In another embodiment, the transaction may be initiated by a customer, who transmits a wireless signal including a request for an image to be fulfilled by a vendor. A vendor agreeing to supply the image responds by sending a wireless signal including an acceptance of the request. Embodiments may include provisions for negotiating the terms (e.g., price) of the transaction. Upon reaching agreement on the terms, the vendor may send a wireless transmission including the image. Alternatively, the vendor may send a wireless transmission including information used by the customer to access the file in another location. By offering the images to customers who are in close proximity to the image capture, the vendor may increase the likelihood that the images will be purchased.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIGS. 1A and 1B are block diagrams illustrating a computing and data communications environment 100, according to one embodiment of the invention. Generally, the environment 100 illustrates the use of short-range wireless signals to carry out a transaction for the sale of an image, according to embodiments of the invention. By limiting the transactions to customers that are in close proximity at the time of image capture, the vendors may ensure that it is more likely that the images will be of interest to the customers. It is contemplated that these transactions may be initiated by either the vendor or the customer, as described in more detail below.

Vendor-Initiated Transaction

In some situations, a vendor (e.g., a professional photographer) may transmit a short-range wireless signal including an offer for sale of one or more images. The offer may be received and accepted by a customer located within range of the transmission. As shown, the environment 100 includes an imaging device 110, wireless devices 120, and a wireless repeater 130. The imaging device 110 is operated by the vendor, and includes a set of images 114, a set of purchase data 116, and a set of filters 118. Illustratively, the imaging device 110 may be any device for capturing digital images, such as a digital camera, a video camcorder, and the like.

In one embodiment, the imaging device 110 is configured to send a vendor signal 140 and an image signal 150, and to receive a customer signal 145. In one embodiment, the various wireless signals 140,145,150 may be short-range wireless signals, such as those that conform to the Bluetooth wireless network protocol. In this situation, the vendor signal 140 includes an offer for sale of one or more images (e.g., the images 114 captured by the imaging device 110). The offer may include a description and an offered price for the image(s) 114, and a network identifier for the imaging device 110.

In one embodiment, a transaction may be initiated when the imaging device 110 transmits a vendor signal 140 including an offer for sale of one or more images. The offer included in the vendor signal 140 may include a thumbnail of the offered image 114. The thumbnail may be a reduced-quality (e.g., smaller size and resolution) version of the image 114, but which provides the customer with sufficient information to determine whether to purchase the image 114.

In addition, the vendor signal 140 may include any other relevant information, such as the type of imaging device (e.g., camera, video recorder, etc.), the properties of the image (e.g., resolution, aspect ratio, bit rate, etc.), a description of the content of the image (e.g., "People," "Scenery," etc.), a time stamp for the image capture, and the like. In one embodiment, the vendor signal 140 may be sent after an image is captured and added to the set of images 114. Alternatively, the vendor signal 140 could be sent whenever the user of the imaging device 110 manually triggers an offer (e.g., by activating a manual control).

In one embodiment, the vendor signal 140 is broadcast generally, and can be received by any wireless devices 120 that are within range of the transmission. In another embodiment, the vendor signal 140 may be sent only to wireless devices 120 that meet criteria specified in the filters 118. For example, the filters 118 may be used to exclude (i.e., not send an vendor signal 140 to) customers whose requirements don't match the capabilities of the imaging device 110, to exclude customers having a poor credit rating, etc. In another example, the imaging device 110 may be configured to apply face recognition technologies to the filters 118 in order to exclude certain images 114 from being offered for sale. That is, the filters 118 may include data describing certain faces (e.g., those of friends or family of the vendor) which, if included in an image, can cause that image to not be offered for sale.

In one embodiment, the vendor signal 140 may only be narrowly transmitted in the same direction that the imaging device 110 is pointed when the image is captured. In this embodiment, the vendor signal 140 may be generated by directional transmission techniques that are known in the art (e.g., directional antennas). By only transmitting the vendor signal 140 to customers located in the same direction as that in which the image is taken, it is more likely to reach persons who are portrayed in the image, and who may thus be more likely to be interested in purchasing the image.

In one embodiment, the imaging device 110 may be configured to derive a set of parametric data from the dimensions and geometries of any faces included in the image 114. Such parametric data is typically unique to each person, and may be used to identify a person portrayed in a given image 114, according to techniques known in the art (e.g., pattern recognition techniques). The imaging device 110 may be further configured to use the parametric data to identify any persons who are included in the image 114, based on a database of facial parameters (not shown). The database may be installed on the imaging device 110, or may be accessed remotely. The database may provide a network address for any wireless devices 120 owned by the identified persons. Thus, the vendor signal 140 may be directed to the network addresses of any local wireless devices 120 owned by the persons included in the image 114.

In one embodiment, a wireless device 120 can be configured to alert the user (i.e., customer) of the receipt of a vendor signal 140, and to present the user with the options of rejecting the offer, accepting the offer, or negotiating the offer. The wireless device 120 may be further configured to transmit a customer signal 145 back to the imaging device 110. In the event that the customer rejects the offer, no further action is performed. In the event that the customer accepts the offer, the customer signal 145 indicates an acceptance of the offer. In the event that the customer wishes to negotiate the offer, he may interact with the wireless device 120 to send a customer signal 145 including a counter-offer. In this situation, the imaging device 110 may be further configured to alert the vendor to the receipt of the counter-offer, and to present the vendor with the options of rejecting the counter-offer, accepting the counter-offer, or negotiating the counter-offer. In the event that the vendor rejects the counter-offer, no further action is performed, and the transaction remains incomplete. In the event that the vendor accepts the counter-offer, a second vendor signal 140, including an acceptance of the counter-offer, is sent back to the wireless device 120. In the event that the vendor wishes to negotiate the counter-offer, the second vendor signal 140, rather than including an acceptance, instead includes a new counter-offer. If required, the vendor and customer may continue to negotiate by this process (i.e., by counter-offering in additional vendor signals 140 and customer signals 145) until an agreement is reached.

In one embodiment, a customer signal 145 indicating an acceptance of an offer may include an identifier unique to the user of the wireless device 120. In one embodiment, the identifier is the email address of the customer. When the customer signal 145 is received by the imaging device 110, the included identifier may be used to create a record in the purchase data 116 stored in the imaging device 110. Each record of the purchase data 116 may also include, for example, a specific offer signal 140, a price paid for the image, and the like.

In one embodiment, the customer signal 145 may include information describing a method of payment, for example credit card information, a bank account number, etc. Optionally, a payment for an image may be handled by a trusted intermediary, who may escrow the payment until confirmation that the image has been received by the customer, or has been deposited at a web site known to be accessible by the customer. At that point, the intermediary can release the payment to the vendor. In another embodiment, the customer may provide the payment at a web site storing the image, where access to the image is prevented until payment is received. In yet another embodiment, the parties may exchange the payment manually, for example by cash or check payment.

The wireless devices 120 could include any device configured to receive and respond to a vendor signal 140, including cellular telephones, portable computers, cameras, etc. It may also be useful to construct devices having the sole purpose of responding to vendor signal 140. Such single-purpose devices could be configured in a small and unobtrusive form, for example a key chain fob.

As shown, the wireless devices 120 may include, or may have access to, a set of filters 124, which may be applied to any incoming vendor signals 140. In one embodiment, the filters 124 may be used to automatically accept or reject an incoming offer, and thus not require any intervention by the user (i.e., customer). Any offers not processed by the filters 124 may then be presented to the customer for approval. The filters 124 may be based on the source of the offer. For example, the filters 124 may only accept offers from predetermined list of vendors, or from vendors having a high score in a customer-satisfaction or peer-review rating web site. The filters 124 may be configured to accept offers based on an available budget for purchasing images. The budget may be an upper limit on a price to be paid for any single image, or an upper limit on the cumulative purchases of images within a session. Additionally, the filters 124 may be based on other information included in the offer (e.g., only accept offers for images of scenery, only accept offers of high-resolution images, etc.).

In one embodiment, the filters 124 may also be used to process any offers of images that may have properties that are of particular interest to the customer. For instance, the filters 124 may include parametric data describing a set of faces that are of interest to customer, for instance the faces of the customer and his family. In one embodiment, the offer included in the vendor signal 140 may include parametric data abstractly describing any faces included in the offered image. The parametric data may be generated by the imaging device 110 based on the image 114, as described above. The wireless device 120 may be configured to compare any parametric data included in an incoming offer to the filters 124, and, if there is a match, to alert the customer or automatically accept the offer.

In one embodiment, once an offer (or counter-offer) is accepted, the image signal 150 is sent from the imaging device 110 to the wireless device 120. The image signal 150 may include the purchased image 114, which is transferred to and stored on the wireless device 120. The size and resolution of the image 114 may be reduced in the imaging device 110, such that the file size of the image 114 is suited for transmission in the image signal 150.

In one embodiment, the image 114 is not transmitted in the image signal 150, but is instead uploaded, along with the purchase data 116, from the imaging device 110 to a media hosting computer, (e.g., the server computing device 220 described in more detail below). The uploaded purchase data may be used to construct an access list. Thereafter, the customers included in the access list may be notified (e.g., by email), and are authorized to access the images. In this embodiment, the image signal 150 may include a receipt that is received and stored on the wireless device 120. The receipt may include an address for a network location for accessing the image. For example, the receipt may include a URL for the media hosting computer. In addition, the receipt may include any other information that the customer may require to access the network location (e.g., a username and password). The customer may be provided with various options for the purchased image, such as editing or customizing the image, creating special effects, etc. These services may be provided by a web application accessed via a web browser, or may be accessed via the wireless device 120. In one embodiment, selection of the various image editing features is provided on a fee basis. In other words, the user may be charged fees in addition to the basis image fee for use of the editing services.

In one embodiment, the receipt included in the media signal 150 may be used by the customer to obtain a hard-copy version of the purchased image 114. That is, rather than retrieving the image from a media hosting computer, the customer may be able to obtain a physical copy of the image, such a glossy photograph, a poster, a film slide, etc. The hard-copy of the image may be available (after some time for uploading, processing, printing, and the like) at a store or booth, or may be delivered to the customer at a later time. It should be noted that, in this embodiment, the imaging device 110 may include film photography (i.e., non-digital) cameras.

In one embodiment, the offer included in the vendor signal 140 may be configured to include contact information (e.g., a URL for the media hosting computer) and a unique offer identifier, which may be used by the customer in the event that the transaction is not initially completed. For example, a customer may not wish to accept the offer (i.e., purchase the image) when it is initially received in the vendor signal 140, or may not come to agreement on a price for the offer while in transmission range of the imaging device 110. In this situation, if the customer later wishes to continue the transaction, he may be able to use the contact information to visit the vendor's website, and may use the offer identifier to view data (e.g., price, thumbnail, etc.) related to the offered image. Thus, the customer may complete the transaction at a later time, even if he is no longer within transmission range of the imaging device 110.

In some situations, it may be useful to extend the vendor signal 140 to a greater range than that afforded by a short-range wireless signal. This extension can be performed by use of a wireless repeater 130, according to one embodiment. The wireless repeater 130 illustrates a device that is configured to repeat (i.e., receive and transmit forward) the vendor signal 140 to other wireless devices, as well as to repeat any customer signals 145 back to the imaging device 110. Thus, the wireless repeater 130 may serve to extend the range of the vendor signal 140. The wireless repeater 130 could also serve as a wireless device 120. That is, the wireless repeater 130 can function to accept a vendor signal 140, as well as repeat the signal for other wireless devices 120 that were not in range of the original signal. However, if the vendor signal 140 is received and repeated by several wireless repeaters 130, it could be repeated too many times, and thus be propagated to a range that is too large to be useful. If so, the people receiving the vendor signal 140 may no longer be in the same area as the imaging device 110, and thus may not be interested in having access to the shared image. To avoid this situation, the imaging device 110 could be configured to enable the user to specify the maximum number of times that a vendor signal 140 can be repeated.

In one embodiment, the vendor signal 140 may include an offer for the future capture of an image (i.e., an offer of photographic services). If the offer is accepted by a customer, a customer signal 145 including an acceptance is sent to the vendor. The acceptance may include the customer's requirements for the image, such as a description of the desired image, or description of face(s) which the customer may wish to have portrayed in the image (e.g., parametric data describing a face, or a thumbnail of a face). The vendor may then capture an image fitting the requirements of the customer.

Customer-Initiated Transaction

In some situations, a customer may transmit a short-range wireless signal including a request to purchase one or more images, and the request may be accepted by a vendor located within range of the transmission. These situations may occur, for example, if a person who does not have an imaging device, or a person who may want images captured by more skilled photographers. Such customer-initiated transactions may be performed using the environment 100 described above with reference to vendor-initiated transactions. However, in the case of customer-initiated transactions, the functionality of the environment 100 differs in several ways, as described below.

In one embodiment, the wireless devices 120 are configured to initiate an image transaction by sending a customer signal 145 including a request for one or more images to be supplied by a vendor (e.g., a professional photographer operating the imaging device 110). The request may include a description of the requested image (e.g., subject matter, resolution, etc.), a price to be paid for the requested image, and a network identifier for the wireless device 120. The imaging device 110 is configured to receive the request included in the customer signal 145, to notify the user (i.e., the vendor) of the request, and to enable the vendor to accept the request. If the vendor accepts the request, the imaging device 110 sends a vendor signal 140 including an acceptance of the request.

In one embodiment, the wireless device 120 and the imaging device 110 may be used to perform a price negotiation (i.e., to offer and counter-offer using wireless signals), as described above. Once an agreement is reached, and the requested image is captured, an image signal 150 may be transmitted to the wireless device 120. The image signal may include the image, or may include a receipt used to retrieve the image at a later time, as described above.

In one embodiment, the requests included in the customer signals 145 may be evaluated by the filters 118 included in the imaging device 110. The filters 118 may be configured to automatically accept or reject an incoming request, and thus not require any intervention by the vendor. The filters 118 may be based on the source of the request (e.g., do not accept requests from customers having a poor credit history), or may be based on other information included in the request (e.g., only accept requests that match the capabilities of the imaging device 110, such as resolution and quality, or that match the level of expertise of the vendor).

In one embodiment, the requests included in the customer signals 145 may include parametric data describing faces that are of interest to the customer (e.g., the face of the customer, faces of friends and family, etc.). In another embodiment, the request may include thumbnail images of the faces of interest to the customer, which may have been stored in the wireless device 120. The imaging device 110 may be configured to recognize the faces of interest to the customer if they are present in the field of view (i.e., viewfinder) of the imaging device 110. The search for faces in the field of view, using the parametric data and/or the thumbnail images included in the request, may be performed using pattern recognition techniques known in the art. If any faces of interest are recognized, the viewfinder of the imaging device 110 may be configured to indicate the recognized faces to the vendor (e.g., by highlighting or circling the recognized faces). In one embodiment, the imaging device 110 may include a screen or a viewfinder that can display the thumbnail images included in the request. The vendor may view the thumbnail images, and then manually search for any people matching the displayed faces. If the vendor finds people which match the thumbnail images, he may then capture an image of them. Thus, by matching the parametric data or the thumbnails included in the request, the vendor is able to capture the image requested by the customer.

In one embodiment, the customer signal 145 including a request is broadcast generally, and can be received by any imaging devices 110 that are within range of the transmission. In another embodiment, the customer signal 145 may be sent only to pre-selected imaging devices 110 (e.g., corresponding to a preferred vendor). The network addresses of the pre-selected imaging devices 110 may be stored, for example, in the filters 124 included in the wireless device 120.

In some situations, a single request for an image may be received by multiple vendors who may wish to be assigned the job of providing the requested image. If so, the job may be assigned to a specific vendor. In one embodiment, the first vendor to respond to a request with a vendor signal 140 may be assigned the job. In another embodiment, the first vendor to send a suitable image in an image signal 150 back to the requestor is assigned the job. In yet another embodiment, the customer may review the multiple vendor signals 140 received by the wireless device 120 in response to the request, and may assign the job to a specific vendor. The customer may then select a vendor based on reputation, quality of imaging devices, and/or pricing.

In one embodiment, the imaging device 110 may be configured to receive multiple customer requests and present them to the user (i.e., vendor). The vendor may select from the received requests to determine whether to accept one (or more) requests. The vendor may select from the received requests by evaluating, for example, the pay being offered, the type of image requested, the quality/resolution of image requested, the level of expertise requested, and the like.

In one embodiment, the imaging device 110 may be configured to determine a direction from which the customer signal 145 including a request was transmitted. In other words, the imaging device 110 may be configured to perform direction finding techniques known in the art (e.g., directional antennas, signal triangulation, etc.). The imaging device 110 may be further configured to indicate to the vendor the direction of the incoming customer signal 145. For example, the viewfinder of the imaging device 110 may include superimposed arrows or lights indicating the direction of the request. By orienting the imaging device 110 to the direction of the customer, the vendor is able to increase the likelihood that the image will capture the requesting customer, and thus the image is more likely to be purchased.

Diagram of System for Controlling Access to Purchased Images

Figure 2A:
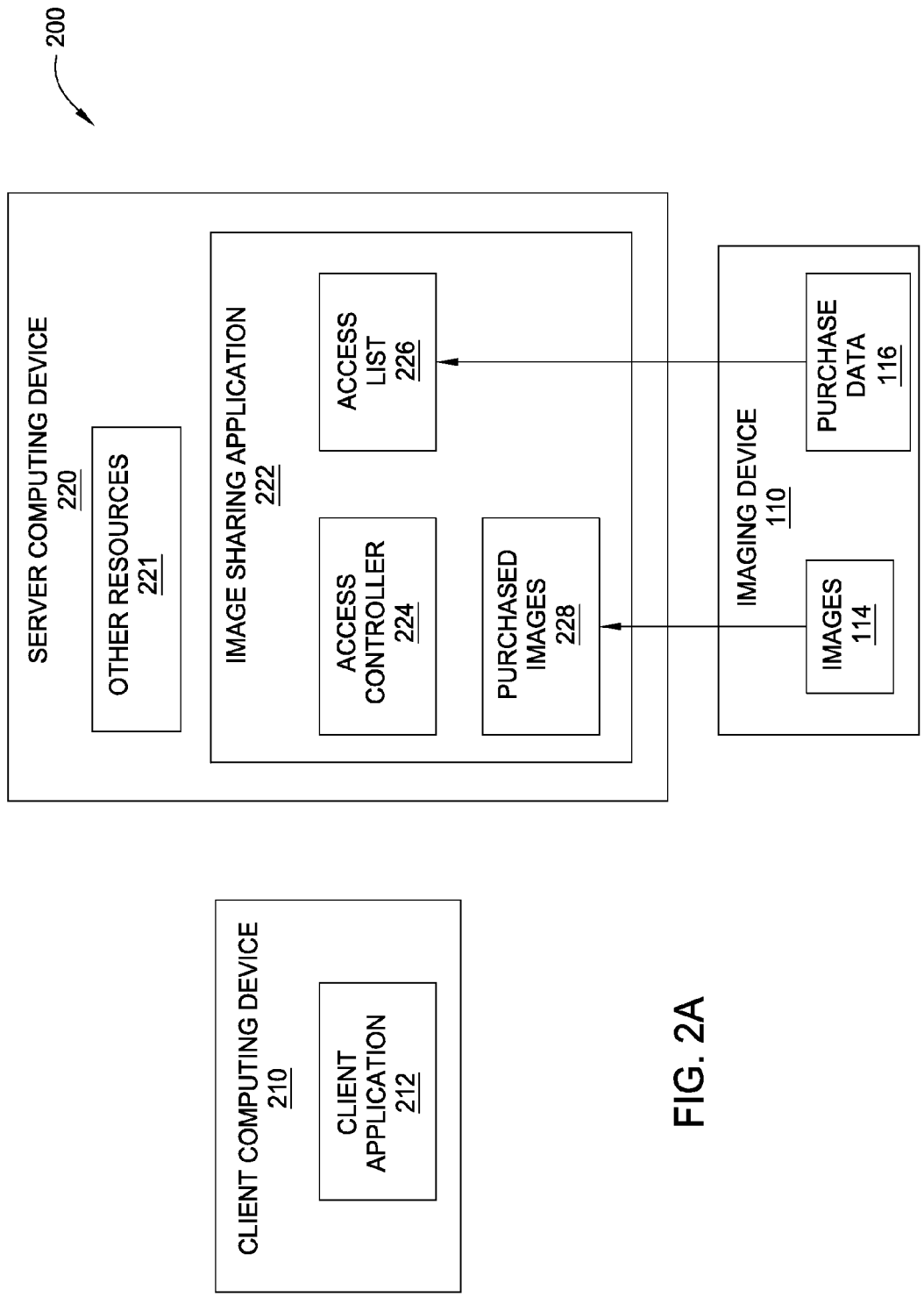
FIGS. 2A-2B each illustrate a block diagram of a computing system for controlling access to digital images, according to an exemplary embodiment.
Figure 2B:
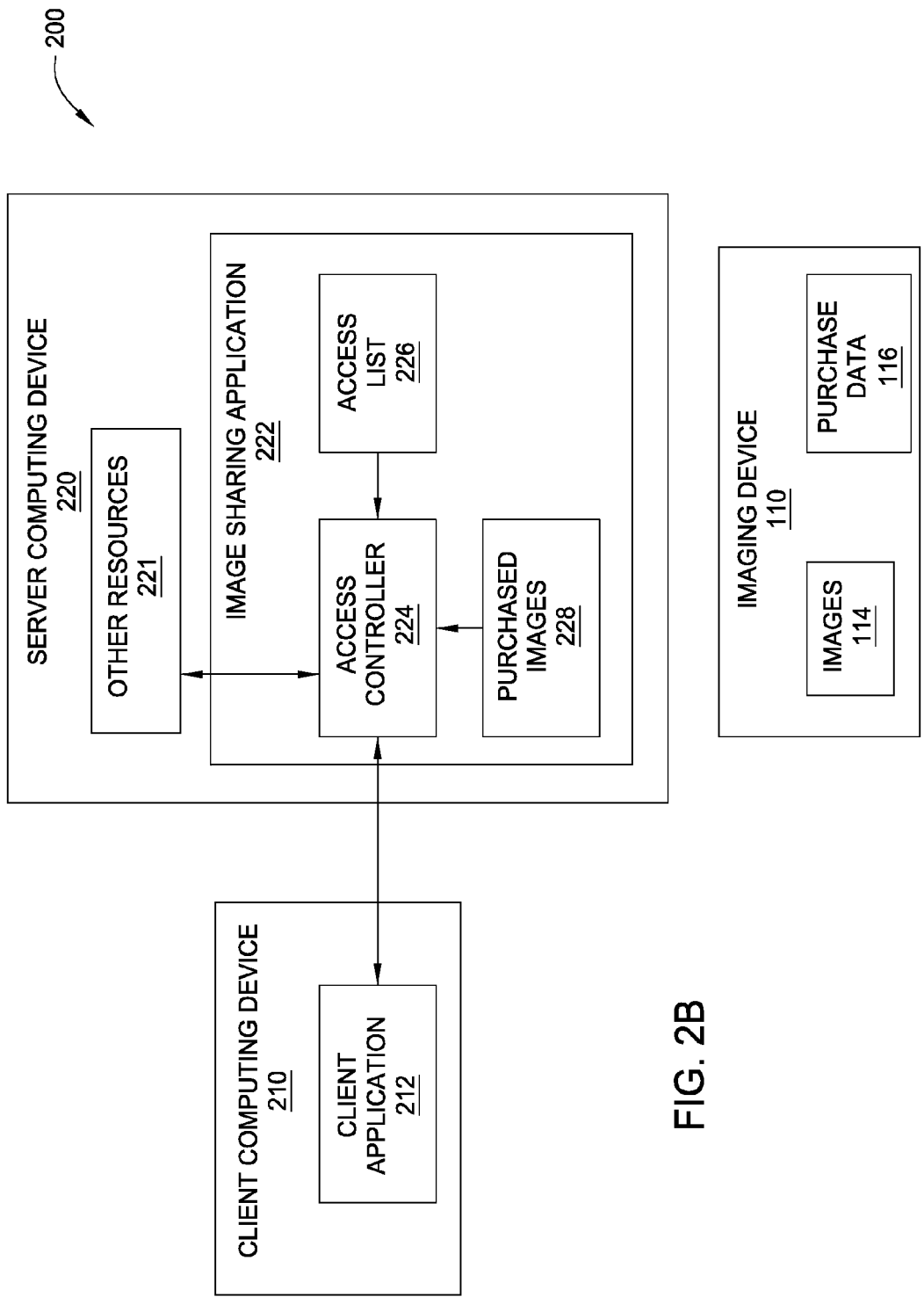

As described, in one embodiment, the images 114 captured in the imaging device 110 may be transferred to a media hosting computer, where they may be accessed by the consumer. FIGS. 2A-2B illustrate a block diagram of a computing system 200 for controlling access to images on a media hosting computer, according to one embodiment of the invention. The computing system 200 includes a client computing device 210, a server computing device 220, and the imaging device 110 illustrated in FIG. 1. The client computing device 210 includes a client application 212 (e.g., a web browser). It is contemplated that the client computing device 210 may be one of the wireless devices 120, according to one embodiment. The server computing device 220 includes an image sharing application 222 (e.g., a web application) and other resources 221. The image sharing application 222 includes an access controller 224, an access list 226, and a set of purchased images 228. The other resources 221 represent any server applications (other than the image sharing application 222) that may be made available to a user of a client computing device 210, for example image editing applications, communications applications, word processing applications, etc.

As shown in FIG. 2A, the purchase data 116 and the set of images 114 are uploaded from the imaging device 110 to the image sharing application 222. The uploaded images 114 are added to the set of purchased images 228, and the uploaded purchase data 116 is used to update the access list 226. The persons included in the access list 226 may be notified of the location of the purchased images 228. In the case where the purchase data 116 includes email addresses, the notifications may be emails generated by the image sharing application 222. The notification may include the network address of the image sharing application 222 (e.g., web address) and the password assigned to the notified user.

For the sake of simplicity, FIG. 2A illustrates the purchase data 116 and the set of images 114 as being separate objects stored within the imaging device 110. However, in one embodiment, each image 114 may include the corresponding purchase data 116. More specifically, each image 114 may be a data object that includes metadata storing the purchase data 116 for that particular image 114. Once an image 114 is uploaded to the image sharing application 222, the purchase data 116 may be extracted from the metadata included in the image 114.

FIG. 2B illustrates the computing system 200 in the event that a user is using the client application 212 to connect to the image sharing application 222 in order to retrieve the images he has purchased. In one embodiment, the user is asked for his identifier (i.e., email address) and password. The access controller 224 determines if the user attempting a connection is a valid member of the access list 226, and if he has provided a valid password. The password may have been provided to the user in a receipt included in the image signal 150 sent by the imaging device 110, as noted above. If the user provides a valid identifier and password, he is allowed to view any purchased images 228 corresponding to his identifier. It also contemplated that the user may be allowed to gain access to other resources 221 on the server computing device 220. The access to the other resources 221 may be based on the price negotiated using the wireless device 120, on a separate transaction executed in the web application, or may be available to all customers for free. Of course, the example described above with reference to FIGS. 2A and 2B is for illustrative purposes only, and is not intended to limit the scope of the invention. It is contemplated that embodiments of the invention may not include all of the elements described above. For example, in other embodiments, the user may be asked to provide either an identifier or a password, or may be identified by some other means (e.g., a cookie, IP address, etc.).

It should be noted that, while the embodiments described above involve short-range wireless signals, it is contemplated that other communications technologies may be used instead. For example, in one embodiment, the various signals 140, 145, 150 described above may be configured as cellular telephone messages.

Flow Diagram for Vendor-Initiated Transaction

FIG. 3 is a flow diagram illustrating a method 300 for a vendor-initiated transaction for the fee-based distribution of media based on device proximity, according to one embodiment of the invention. Persons skilled in the art will understand that, even though the method 300 is described in conjunction with the systems of FIG. 1 and FIGS. 2A-2B, any system configured to perform the steps of method 300, in any order, is within the scope of the present invention. The method 300 is described with respect to portable wireless devices, where at least one of the devices is capable of capturing an image.

The method 300 begins at step 310, when an offer for sale of one or more images is sent by a first wireless device. In one embodiment, the first wireless device is capable of capturing a digital image (e.g., imaging device 110). The offer may include information related to the image, such as an asking price, image quality, etc. In addition, the offer may include a thumbnail version of the offered image, and/or parametric data describing the faces of people included in the image. The offer may be included in a short-range wireless transmission (e.g., vendor signal 140), according to one embodiment. Alternatively, the offer may be transmitted by some other medium, for instance cellular telephone messages. It is contemplated that the offer may be broadcast indiscriminately or alternatively may be transmitted only to selected devices (which may or may not be in the vicinity). It is also contemplated that the offer may be broadcast in approximately the same direction as that in which the image was captured, thus reaching persons who may be included in the image. The offer may be sent automatically (e.g., when imaging device 110 captures an image), or may be sent manually (e.g., by a user activation of a control).

At step 320, the offer is received by a second wireless device (e.g., wireless device 120) in the same vicinity as the first wireless device. At step 330, the offer is evaluated according to a filter (e.g., filters 124). If the offer is rejected by the filter, the transaction ends. Otherwise, the method 300 continues to step 340, at which the user of the second wireless device (i.e., the customer) is presented with the option of accepting the offer. If the customer accepts the offer, the method 300 continues to step 370. Otherwise, at step 350, the customer may choose whether to reject the offer or to negotiate the price with the user of the first wireless device (i.e., the vendor). If the customer chooses to reject the offer, the method 300 ends. Otherwise, the price is negotiated. The price negotiation may be carried out over additional wireless signals (e.g., vendor signals 140 and customer signals 145).

At step 360, if no agreement is reached on the price (or other terms), the transaction ends. Otherwise, the method 300 continues to step 365, at which the customer may send an acceptance of the offer (e.g., in customer signal 145). The acceptance may include an identifier that uniquely identifies the customer, such as an email address. The customer identifier, and other data related to the purchase, may be stored in the first wireless device (e.g., in purchase data 116).

At step 370, a receipt is sent from the first wireless device to the second wireless device (e.g., in image signal 150). The receipt may include a URL for a media hosting computer (e.g., server computing device 220), as well as an identifier and password for accessing the purchased image. In one embodiment, rather than sending a receipt, the first wireless device may transmit the image to the second wireless device. The image may be reduced in size or resolution in order to facilitate transmission.

At step 380, the information included in the receipt may be used by the consumer to access the purchased image(s) at a media hosting computer. The image(s) and related purchase information may have been uploaded from the first wireless device to the media hosting computer. An access list (e.g., access list 226) may be composed from the purchase information, and may be used to control access to the purchased images (e.g., purchased images 228). That is, any user attempting to access the purchased images is first verified against the access list. The access list may also be used to control access to other resources available on the media hosting computer (e.g., other resources 221). The access list may be generated by the first wireless device, or may be generated by an external application (e.g., image sharing application 222).

Flow Diagram for Customer-Initiated Transaction

Figure 4:
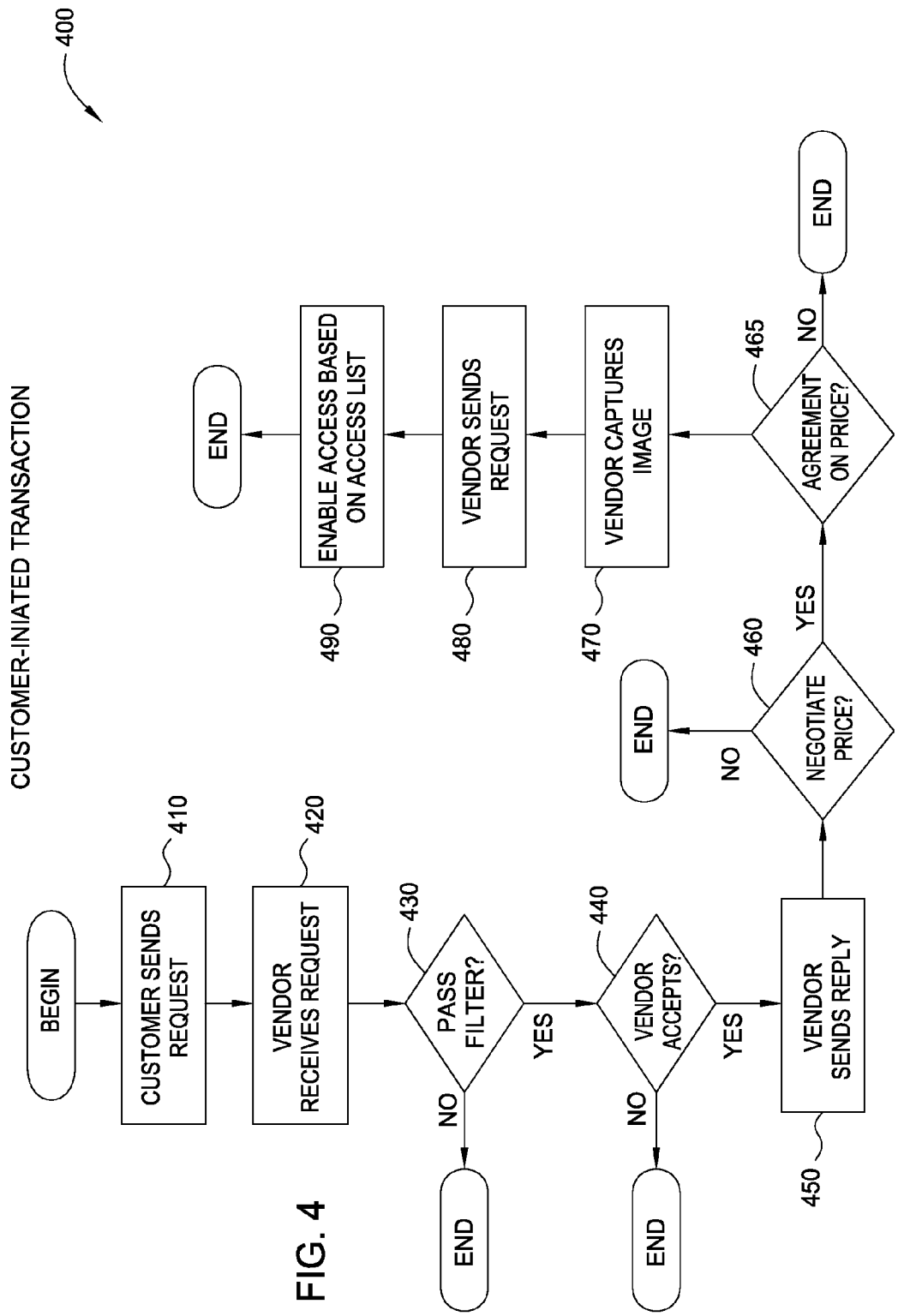
FIG. 4 is a flow diagram illustrating a method for a customer-initiated transaction for the fee-based distribution of media based on device proximity, according to an exemplary embodiment.

FIG. 4 is a flow diagram illustrating a method 400 for a customer-initiated transaction for the fee-based distribution of media based on device proximity, according to one embodiment of the invention. Persons skilled in the art will understand that, even though the method 300 is described in conjunction with the systems of FIG. 1 and FIGS. 2A-2B, any system configured to perform the steps of method 300, in any order, is within the scope of the present invention. The method 400 is described with respect to portable wireless devices, where at least one of the devices is capable of capturing an image.

The method 400 begins at step 410, when a request for purchase of one or more images is sent to a first wireless device from a second wireless device. The request may describe an image that a customer wishes to purchase, and may include requirements for the image, such as a price, image quality, etc. In addition, the request may include descriptions of people which the customer wishes to include in the image. Such descriptions may include parametric data and thumbnail images. The request may be included in a short-range wireless transmission (e.g., customer signal 145), according to one embodiment. Alternatively, the request may be transmitted by some other medium, for instance cellular telephone messages. It is contemplated that the request may be broadcast indiscriminately, or may be transmitted only to selected devices (which may or may not be in the vicinity).

At step 420, the request is received by the first wireless device, which is in the same vicinity as the second wireless device (e.g., wireless device 120). In one embodiment, the first wireless device is capable of capturing a digital image (e.g., imaging device 110). At step 430, the request is evaluated according to a filter (e.g., filters 118). If the offer is rejected by the filter, the transaction ends. Otherwise, the method 400 continues to step 440, at which the user of the first wireless device (i.e., the vendor) is presented with the option of accepting the request. In one embodiment, the vendor may be presented with multiple requests received by the first wireless device, and is able to select which request(s) to accept. If the vendor rejects the request, the method 400 ends. Otherwise, at step 450, a reply may be sent to the second wireless device (e.g., in a vendor signal 140). The reply may include an acceptance of the request, or may include an offer to perform the request for a price.

At step 460, in the case that the reply sent in step 450 included an offer, the customer may choose whether to reject the offer or to negotiate the price with the vendor. If the customer chooses to reject the offer, the method 400 ends. Otherwise, the price is negotiated. The price negotiation may be carried out over additional wireless signals (e.g., vendor signals 140 and customer signals 145). At step 465, if no agreement is reached on the price (or other terms), the transaction ends. If an agreement is reached, data related to the transaction may be stored in the first wireless device (e.g., in purchase data 116), and the method 400 continues to step 470.

At step 470, the vendor captures the requested image. In one embodiment, the vendor may capture the image based on descriptions of people included in the request (i.e., parametric data and/or thumbnail images). In another embodiment, the vendor may orient the imaging device to capture an image in the direction from which the request was transmitted.

At step 480, a receipt is sent from the first wireless device to the second wireless device (e.g., in image signal 150). The receipt may include a URL for a media hosting computer (e.g., server computing device 220), as well as an identifier and password for accessing the purchased image. In one embodiment, rather than sending a receipt, the first wireless device may transmit the image to the second wireless device. The image may be reduced in size or resolution in order to facilitate transmission.

At step 490, the information included in the receipt may be used by the consumer to access the purchased image(s) at a media hosting computer. The image(s) and related purchase information may have been uploaded from the first wireless device to the media hosting computer. An access list (e.g., access list 226) may be composed from the purchase information, and may be used to control access to the purchased images (e.g., purchased images 228). That is, any user attempting to access the purchased images is first verified against the access list. The access list may also be used to control access to other resources available on the media hosting computer (e.g., other resources 221). The access list may be generated by the first wireless device, or may be generated by an external application (e.g., image sharing application 222).

In the above examples, embodiments of the invention are described in terms of digital images. However, these descriptions are provided for illustrative purposes, and in no way limit the scope of the invention. It is contemplated that embodiments of the invention may comprise other forms of content, for example audio recordings. Thus, more generally, embodiments of the present invention are directed to any digital and non-digital media, including images, video, and audio content.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   capturing an image on an image capture device;
   deriving parametric data for a face of at least a first person depicted in the image;
   transmitting an offer for sale of the image to one or more devices within range of the transmission, wherein the offer for sale comprises an identifier of the image, the derived parametric data, and a fee, wherein each of the one or more devices has a respective filter which includes parametric data describing at least one face of interest to a customer associated with that device, and wherein each device presents the offer for sale on that device only upon determining the derived parametric data in the offer for sale matches the parametric data in the respective filter;
   receiving at least one acceptance of the offer for sale from at least one of the one or more devices within range of the transmission; and
   in response to receiving the at least one acceptance, generating, by operation of one or more computer processors, an access list corresponding to the image, wherein the access list includes an identifier included in each acceptance of the offer for sale, and wherein access to the image is limited based on the identifier included in each acceptance of the offer for sale.

2. The method of claim 1, further comprising transferring the image to an image sharing server.

3. The method of claim 1, further comprising controlling access to the image based on the access list by permitting access only for requests associated with the at least one acceptance of the offer for sale.

4. The method of claim 1, further comprising negotiating the fee with at least one of the devices within range of the transmission prior to receiving the at least one acceptance of the offer for sale from that device.

5. The method of claim 1, further comprising transmitting the offer for sale in a same direction as a direction in which the image capture device was oriented when the image was captured.

6. The method of claim 1, wherein the access list is stored as metadata embedded in the image.

7. A non-transitory computer readable storage medium containing a program, which, when executed, performs an operation comprising:
   capturing an image on an image capture device;
   deriving parametric data for a face of at least a first person depicted in the image; transmitting an offer for sale of the image to one or more devices within range of the transmission, wherein the offer for sale comprises an identifier of the image, the derived parametric data, and a first fee, wherein each of the one or more devices has a respective filter which includes parametric data describing at least one face of interest to a customer associated with that device, and wherein each device presents the offer for sale on that device only upon determining the derived parametric data in the offer for sale matches the parametric data in the respective filter;
   receiving at least one acceptance of the offer for sale from at least one of the one or more devices within range of the transmission; and
   in response to receiving the at least one acceptance, generating an access list corresponding to the image and defining accessibility to the image, wherein the access list includes an identifier included in each acceptance of the offer for sale, and wherein access to the image is limited based on the identifier included in each acceptance of the offer for sale.

8. The computer readable storage medium of claim 7, wherein the operation further comprises transferring the image to an image sharing server.

9. The computer readable storage medium of claim 7, wherein the operation further comprises controlling access to the image based on the access list by permitting access only for requests associated with the at least one acceptance of the offer for sale.

10. The computer readable storage medium of claim 7, wherein the operation further comprises transferring the image, via one or more wireless image transmissions, to the at least one device from which the acceptance was received.

11. The computer readable storage medium of claim 7, wherein the operation further comprises transmitting the offer for sale in a same direction as a direction in which the image capture device was oriented when the image was captured.

12. The computer readable storage medium of claim 7, wherein the offer for sale further comprises a reduced quality version of the image.

13. The computer readable storage medium of claim 7, wherein the operation further comprises:
   receiving from one of the one or more devices a request for purchase of one or more images for a second fee, wherein the request comprises at least one condition describing the one or more images and the identifier corresponding to the device from which the request for purchase was received; and
   capturing at least one image fulfilling the at least one condition.

14. The computer readable storage medium of claim 13, wherein the request further comprises one or more thumbnail images of faces of persons, and wherein the operation further comprises presenting at least one of the one or more thumbnail images of faces of persons.

15. The computer readable storage medium of claim 13, wherein the request further comprises data describing one or more faces of persons, and wherein the operation further comprises:
   determining, based on the data describing the one or more faces of persons, whether the one or more faces are present in a viewfinder of the image capture device; and
   upon determining that the one or more faces are present in the viewfinder, indicating the one or more faces in the viewfinder.

16. The computer readable storage medium of claim 7, wherein the access list is stored as metadata embedded in the image.

17. A system comprising:
   a computing device; and
   an image capture device configured to, in conjunction with the computing device:
      capture an image,
      derive parametric data for a face of at least a first person depicted in the image,
      transmit an offer for sale of the image to one or more devices within range of the transmission, wherein the offer for sale comprises an identifier of the image, the derived parametric data, and a fee, wherein each of the one or more devices has a respective filter which includes parametric data describing at least one face of interest to a customer associated with that device, and wherein each device presents the offer for sale on that device only upon determining the derived parametric data in the offer for sale matches the parametric data in the respective filter,
      receive at least one acceptance of the offer for sale from at least one of the one or more devices within range of the transmission, and
      in response to receiving the at least one acceptance, generate an access list corresponding to the image, wherein the access list includes an identifier included in each acceptance of the offer for sale, and wherein access to the image is limited based on the identifier included in each acceptance of the offer for sale, and
      provide the access list to the computing device, wherein the computing device controls access to the image based on the access list by permitting access only for requests associated with the at least one acceptance of the offer for sale.

18. The system of claim 17, wherein the access list is stored as metadata embedded in the image.

* * * * *